United States Patent [19]

Hanson

[11] 4,283,012
[45] Aug. 11, 1981

[54] SELF-CLEANING NOZZLE CONSTRUCTION FOR PRODUCT ENROBING APPARATUS

[75] Inventor: Harold W. Hanson, Newport Beach, Calif.

[73] Assignee: Par-way Mfg. Co., Newport Beach, Calif.

[21] Appl. No.: 90,040

[22] Filed: Oct. 31, 1979

[51] Int. Cl.³ .................... B05B 15/02; B05C 5/00
[52] U.S. Cl. ........................................ 239/118; 118/17; 118/24; 239/411; 239/417.3; 239/424
[58] Field of Search ................ 239/114–118, 239/123, 411, 417.3, 424, 70, 566; 118/17, 24, 302

[56] References Cited
U.S. PATENT DOCUMENTS

| | | | |
|---|---|---|---|
| 2,296,079 | 9/1942 | Anderson | 239/118 |
| 4,155,508 | 5/1979 | Fiorentini | 239/118 |
| 4,193,373 | 3/1980 | Hanson, Jr. et al. | 118/17 |

*Primary Examiner*—Andres Kashnikow
*Attorney, Agent, or Firm*—Fulwider, Patton, Rieber, Lee & Utecht

[57] ABSTRACT

A nozzle for spraying food ingredients including an inner orifice for the ingredients and an outer orifice for spray air. A piston is reciprocable in a cylinder within a housing above the orifices. Attached to the piston is a clean-out plunger that extends through an ingredient delivery tube into the inner nozzle orifice as the piston reciprocates, thereby cleaning and unclogging the inner orifice. Displacement of the piston is caused by compressed control air supplied through two air ports in the cylinder on opposite sides of the piston. Reciprocation of the piston can be initiated by a timer or by a manual override.

18 Claims, 7 Drawing Figures

SELF-CLEANING NOZZLE CONSTRUCTION FOR PRODUCT ENROBING APPARATUS

FIELD OF THE INVENTION

The present invention relates to apparatus for enrobing food products, and, more particularly, to such an apparatus that includes self-cleaning provisions for preventing clogging of a nozzle.

BACKGROUND OF THE INVENTION

Food products are commonly enrobed by an ingredient spray. Ingredients that are applied in this way, often in form of a slurry, include, for example, chocolate and a variety of coatings for chips.

Spraying is conventionally accomplished by a nozzle having an inner orifice through which the ingredient passes and an outer orifice through which low pressure spray air from a blower is supplied. Clogging of such nozzles often presents a problem that is generally attributable to the low pressure of the spray air, the high viscosity of the ingredient, and, many times, the non-uniformity of the ingredient, especially when it is in the form of a slurry.

Clogging of a nozzle in an automated food processing operation can cause a large quantity of food to be improperly sprayed or not sprayed at all. Moreover, when certain ingredients are sprayed it is necessary to interrupt the spraying process for frequent cleaning, which may require extensive disassembly of the apparatus. Intermittent clogging may still occur necessitating further down time.

A primary objective of the present invention is to provide an apparatus for the spray of food ingredients that includes internal self-cleaning provisions, thereby reducing or eliminating the need to disassemble and clean the apparatus manually. A further objective is to provide such an apparatus that can be easily maintained and disassembled in minimum time when required. A further objective is to provide such an apparatus that can be unclogged or cleaned either manually or automatically as desired.

SUMMARY OF THE INVENTION

The above objectives are accomplished by an apparatus constructed in accordance with the present invention. It includes an ingredient tube for carrying a food ingredient to be sprayed and a spray air tube for carrying air to assist in the spraying of the ingredient. A spray air passage connects the spray air tube to an annular outer orifice of a nozzle while an ingredient passage connects the ingredient tube to a centered inner orifice. A piston is reciprocable toward and away from the nozzle orifice within a cylinder on the opposite side of the ingredient tube. First and second air ports on opposite sides of piston are connected to control air passages, whereby compressed air is selectively supplied to the cylinder to cause displacement of the piston. A clean-out plunger is connected to the piston and aligned with the inner orifice so that it will enter and clean that orifice upon reciprocation of the piston.

It is preferred that the outer orifice be separated from the inner orifice by a conical wall. The plunger has a conical portion that engages the wall and an end portion of reduced diameter that can project through the inner orifice. In addition to its clean-out function, the plunger can be used as a shut-off device.

The above described apparatus is suitable for use in combination with a timer that actuates valves in the control air passages to cause the pistons to reciprocate at regular intervals. Provision for manually overriding the timer can also be included.

According to one embodiment of the invention, a plurality of spray nozzles are arranged in a row along an elongated common housing. The housing is divided longitudinally into upper and lower sections, the ingredient tube extending through the lower section. The cylinders and control air passages are formed in the upper section. Assembly and disassembly of the apparatus is greatly simplified since the removal of the upper portion of the housing exposes all of the nozzle openings in the lower section. Moreover, the number of separate components required is greatly reduced.

In another embodiment, each nozzle has a separate two section housing. The ingredient tube is clamped between the two sections and the nozzle is supported in this manner.

Other features and advantages of the present invention will become apparent from the following detailed description, taken in conjunction with the accompanying drawings, which illustrate, by way of example, the principles of the invention.

DESCRIPTION OF THE PREFERRED EMBODIMENTS

Figure 1:
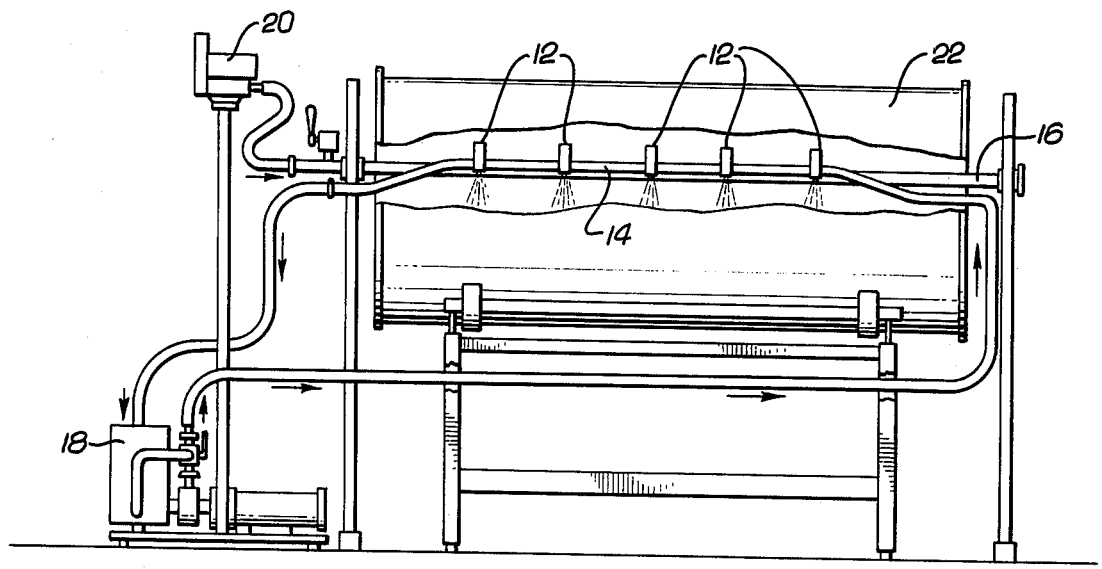
FIG. 1 is a side elevation of a first spray apparatus constructed in accordance with the invention, a portion of the apparatus being broken away to expose the nozzles.

An exemplary food product enrobing apparatus 10 in which the present invention is embodied, illustrated in FIGS. 1-5 of the accompanying drawings has a single row of nozzles 12 each connected to an ingredient supply tube 14 and a parallel spray air supply tube 16. Circulation of the ingredient, usually in the form of a slurry, through the tube or passage 14 is caused by a pump 18. Low pressure air is forced into the spray air tube 16 by a blower 20.

The row of nozzles 12 extends parallel to and slightly above the horizontal axis of symmetry of a rotatable barrel or tumbler 22. Thus, products such as chips are sprayed on all sides as they are kept in a constant state of movement by the rotation of the tumbler 22.

Figure 2:
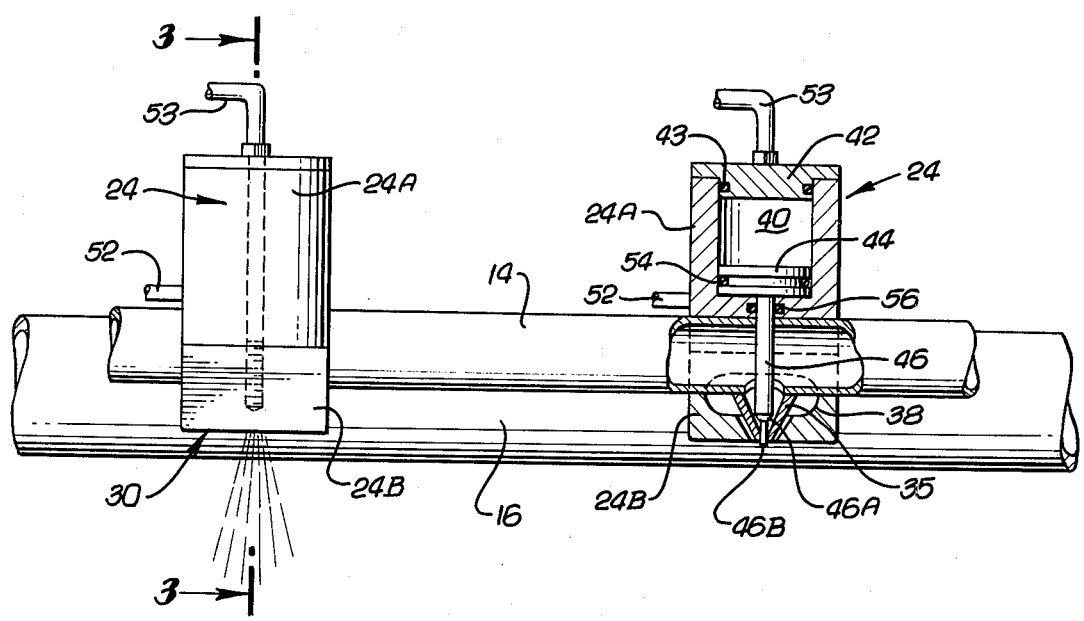
FIG. 2 is a side elevation of a first spray portion of the apparatus, one valve being partially broken away to expose its interior structure with the piston and plunges in the actuated or clean-out position.
Figure 3:
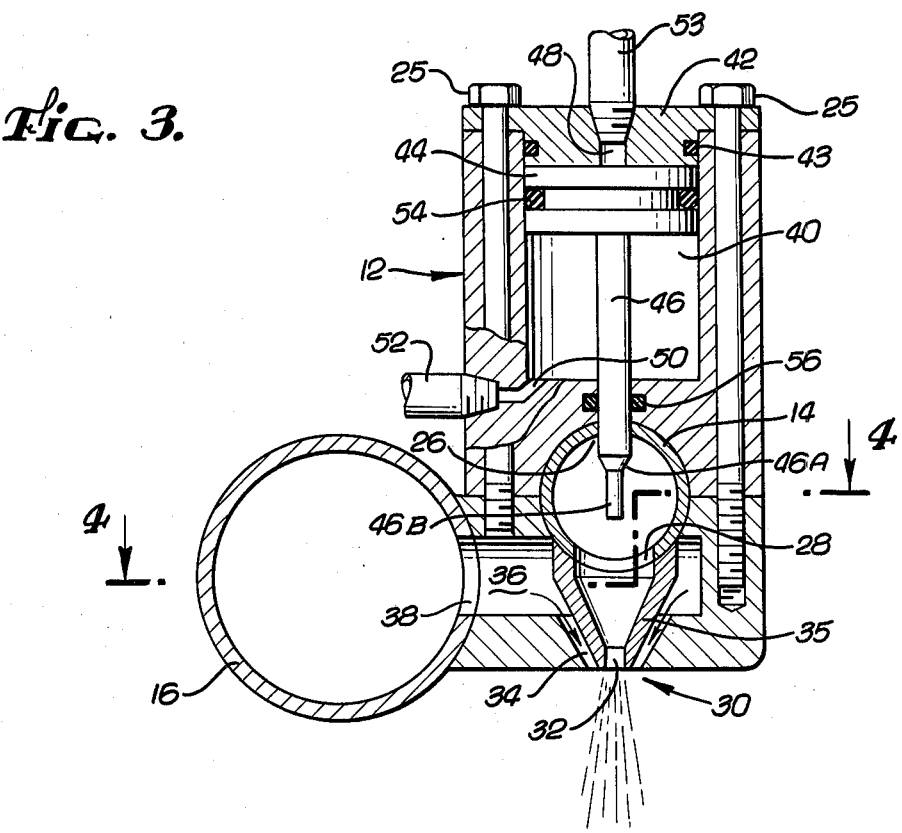
FIG. 3 is a vertical cross-section of a single nozzle showing the plunger in its withdrawn position.

The invention relates more particularly to the individual nozzles 12, one of which is shown in greater detail in the partially broken away view on the right hand side of FIG. 2 and in the cross-sectional view of FIG. 3. The nozzle 12 includes a box-like housing 24 that has an upper section 24A and a separate lower section 24B. The upper section 24A is attached to the lower section 24B by two bolts 25 so that the ingredient tube 14 is clamped between the upper and lower housing sections. In this way, the ingredient tube 14 supports the nozzle 12.

Within the housing 24 of the nozzle 12, the ingredient tube 14 has diametrically opposed upper and lower apertures 26 and 28. A nozzle opening 30 formed in the lower body 24B has a centered inner orifice 32 of circular cross-section that extends downwardly in alignment with the lower aperture 28. A concentric annular outer orifice 34 surrounds the inner orifice 32. The inner and outer orifices 32 and 34 are separated by a tappered wall 35 that depends from the bottom of the ingredient tube 14. The wall 35 thus forces the ingredient to flow through a relatively narrow space at the bottom of the inner orifice 32 for only a short distance after first having flowed through the wider portion above. This configuration minimizes clogging. The lower housing section 24B also defines a generally horizontal cavity 36 that is aligned with an aperture 38 in the side of the spray air tube 16 so that the outer orifice 34 communicates with the interior of that tube.

It will be apparent from the structure described above that the ingredient from the tube 14 passes through the inner orifice 32 of the nozzle 30 and, with an assist from the spray air the air tube 16, is propelled downwardly into the tumbler 22.

Centered within the upper housing section 24A is a vertically oriented cylinder 40 closed by a top-plate 42 and an air tight seal 43. A piston 44 can reciprocate freely within the cylinder 40.

Attached to the bottom of the piston 44, at its center, is a vertically oriented clean-out plunger 46. The plunger 46 is long enough that when the piston 44 is at the top of the cylinder 40 the plunger extends through the upper aperture 26 of the ingredient tube 14 but the bottom of the plunger does not reach the lower aperture 28 with which it is aligned.

Upon downward displacement of the piston 44, the plunger 46 enters the inner orifice 32 of the nozzle 12 and, when the piston has reached the bottom of the cylinder 40, the plunger projects through the bottom of the nozzle opening 30. The plunger 46 has a tappered, conical portion 46A that fits within the conical inner orifice 32 while an end portion 46B of reduced diameter projects below the wall 35 to clean out any residual ingredient that may have collected within or adjacent to the nozzle 12 to prevent a build-up of ingredient material that might lead to clogging. There is, however, enough clearance between the plunger 46 and the sides of the inner orifice 32 to prevent the plunger from becoming jammed. Movement of the piston 44 is caused by compressed control air selectively supplied to the cylinder 44 through either of two air ports 48 and 50.

Normally, pressure is maintained in a control air line 52 leading to the lower port 50 so that the piston 44 remains in its upper position, as illustrated in FIG. 3. The lower end 50 of the plunger 46 is then positioned within the ingredient tube 14 and does not obstruct the inner orifice 32. Escapement of air from the cylinder 40 is prevented by a piston ring 54 that encircles the piston 44 and an O-ring seal 56 held in a groove in the upper body section 24A and surrounding the plunger 46 between the bottom of the cylinder 40 and the top of the ingredient tube 14.

When the nozzle 12 is to be cleaned, pressure is applied to the upper port 48 through a control air line 53 so that the piston 44 is displaced downwardly, causing the plunger 46 to enter the nozzle opening 30. It remains in the lower position (FIG. 2 at right hand side) until pressure is once again applied at the lower port 50.

Figure 4:
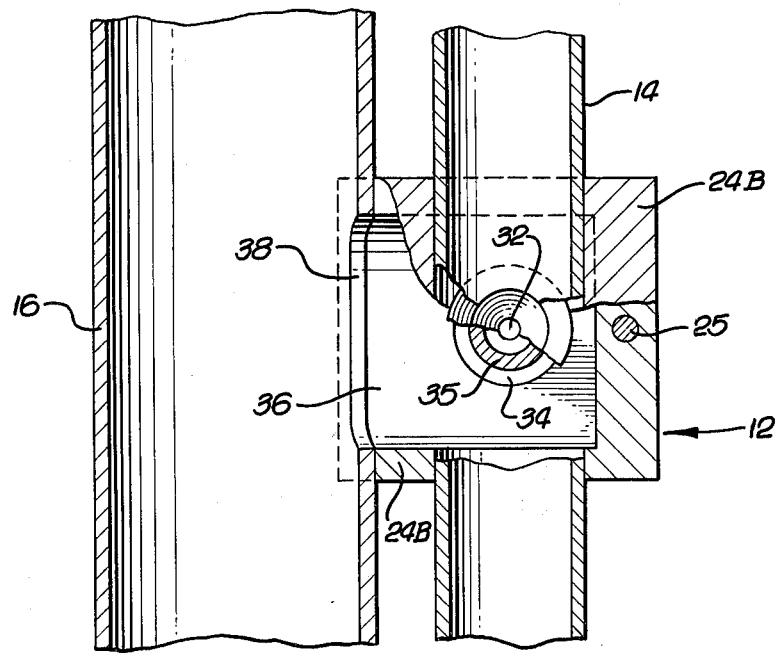
FIG. 4 is horizontal cross-section of the nozzle taken substantially as indicated by the line 4—4 of FIG. 3.

An arrangement for the control of the nozzles 12 is shown schematically in FIG. 4. Air from the compressor 18 is supplied to a series of valves 57, each valve being associated with one of the nozzles 12. The valves 57 are operated by solenoids 58 in response to inputs from an electronic timer 60. Depending upon the position of the valves 57, air can be supplied to the cylinders 40, either from the upper control air supply lines 53 or the lower supply lines 52.

The operation of the timer 60 is such that the control air is normally applied to the lower lines 52 but is applied to the upper control lines 53 for short periods at regular intervals to actuate the plungers 46. A manual switch 62 is interposed between the timer 60 and each of the individual valves 57. The function of the switches 62 is to permit the operator of the device to override the timer 60 and actuate the plunger 46 at will. It will be understood that while the particular arrangement for directing the control air illustrated in FIG. 4 is preferred, other arrangements can be devised by those skilled in the art.

It should be noted that whether the plunger 46 is in the withdrawn position of FIG. 3 or the inserted position of FIG. 2, it tends to remain at rest during the opening of the apparatus 10 unless control air is supplied from a different direction. Accordingly, the plunger 46 can be conveniently employed as a shut-off device. Once the plunger 46 is in the shut-off or inserted position the control air pressure can be discontinued but the nozzle 12 remains closed. This is a particularly useful feature if, for example, it is desired to selectively deactivate some nozzles 12 while others remain operational. When the nozzles 12 are in the shut-off mode, the conical surfaces 46A of the plunger 46 engaged the corresponding conical inner surface of the walls 35 to prevent leakage of the ingredient.

Figure 6:
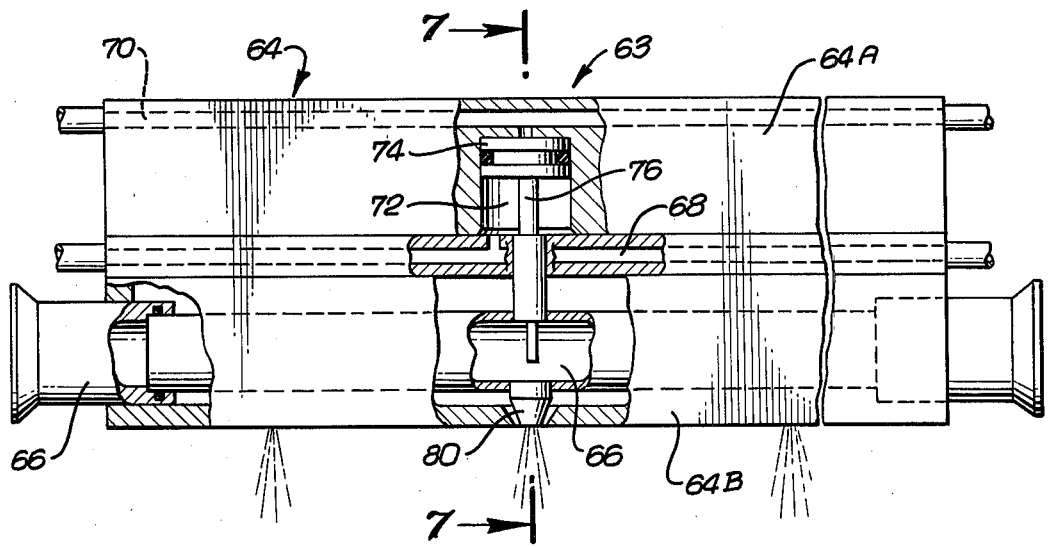
FIG. 6 is partially broken away side elevation of a second spray apparatus constructed in accordance with the present invention; and a portion of the apparatus being partially broken away to expose the interior structure of one valve with the plunger in its withdrawn position.
Figure 7:
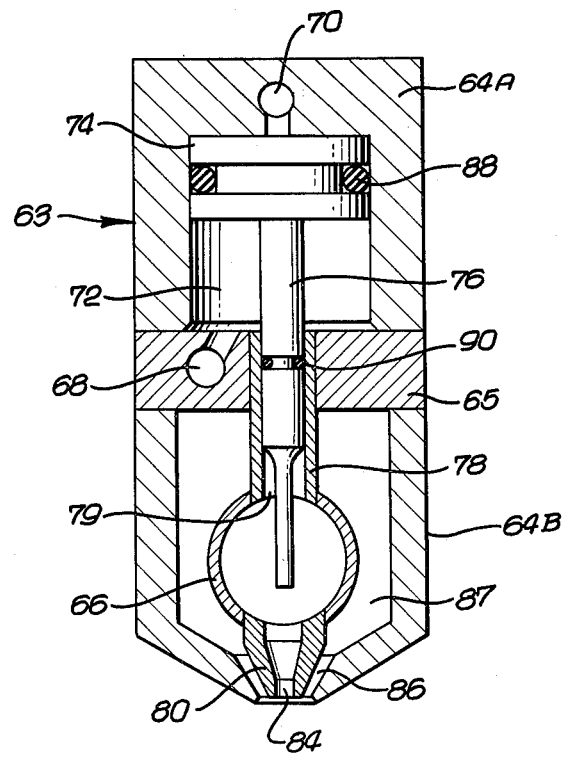
FIG. 7 is a cross-section of a single nozzle of the apparatus of FIG. 6, taken substantially as indicated by the line 7—7 of FIG. 6 and showing the plunger in its withdrawn position.

A second embodiment of the present invention, shown in FIGS. 6 and 7, includes a group of nozzles 63 contained within a single elongated, box-like housing 64. The housing 64 has a one-piece upper section 64A and a one-piece lower section 64B. An ingredient tube 66 extends longitudinally through the lower section 64B of the housing 64. The upper and lower sections 64A and 64B are separated by a divider plate 65. A lower control air passage 68 extends through the divider plate 65 and an upper control air passage 70 extends through the upper section 64A of the housing 64, the air passages being connected to a row of cylinders 72 defined by the upper section (only one representative cylinder being shown in the drawings).

A piston 74 reciprocates vertically within each cylinder 72 and carries a downwardly projecting clean-out plunger 76 attached to its underside. A tubular member 78 is provided in which the plunger 76 slides vertically. This tubular member 78 extends downwardly through an aperture in the divider plate 65 into a vertically aligned aperture 79 in the top of the ingredient tube 66.

Extending from the bottom of the ingredient tube 66 is a wall 80 that is annular at the top and conical at the bottom. The wall 80 divides a nozzle opening 82 in the bottom of the lower section 64B into a centered inner ingredient orifice 84 and concentric, annular outer spray air orifice 86. The bottom end of the plunger 76 is contoured to fit snugly within the inner orifice 84 in the same manner as in the valve 12 described above.

Spray air is supplied to the outer orifice 84 by a cavity 87 that extends continuously through the lower housing section 64B, closed at the top by the divider plate 65. This cavity 87 forms a spray air delivery passage that surrounds the ingredient tube 66.

The operation of each nozzle 63 is basically the same as that of the nozzles 12. Compressed control air causes the piston 74 to be displaced downwardly within the cylinder 72 to clean out the inner orifices 84. Air leakage is prevented by a piston ring 88 and by an O-ring seal 90 that surrounds the plunger 76. Unlike the nozzle 12, the O-ring 90 is carried within a circumferential groove in the plunger 76 and reciprocates within the tubular member 78 as the piston 74 moves.

Figure 5:
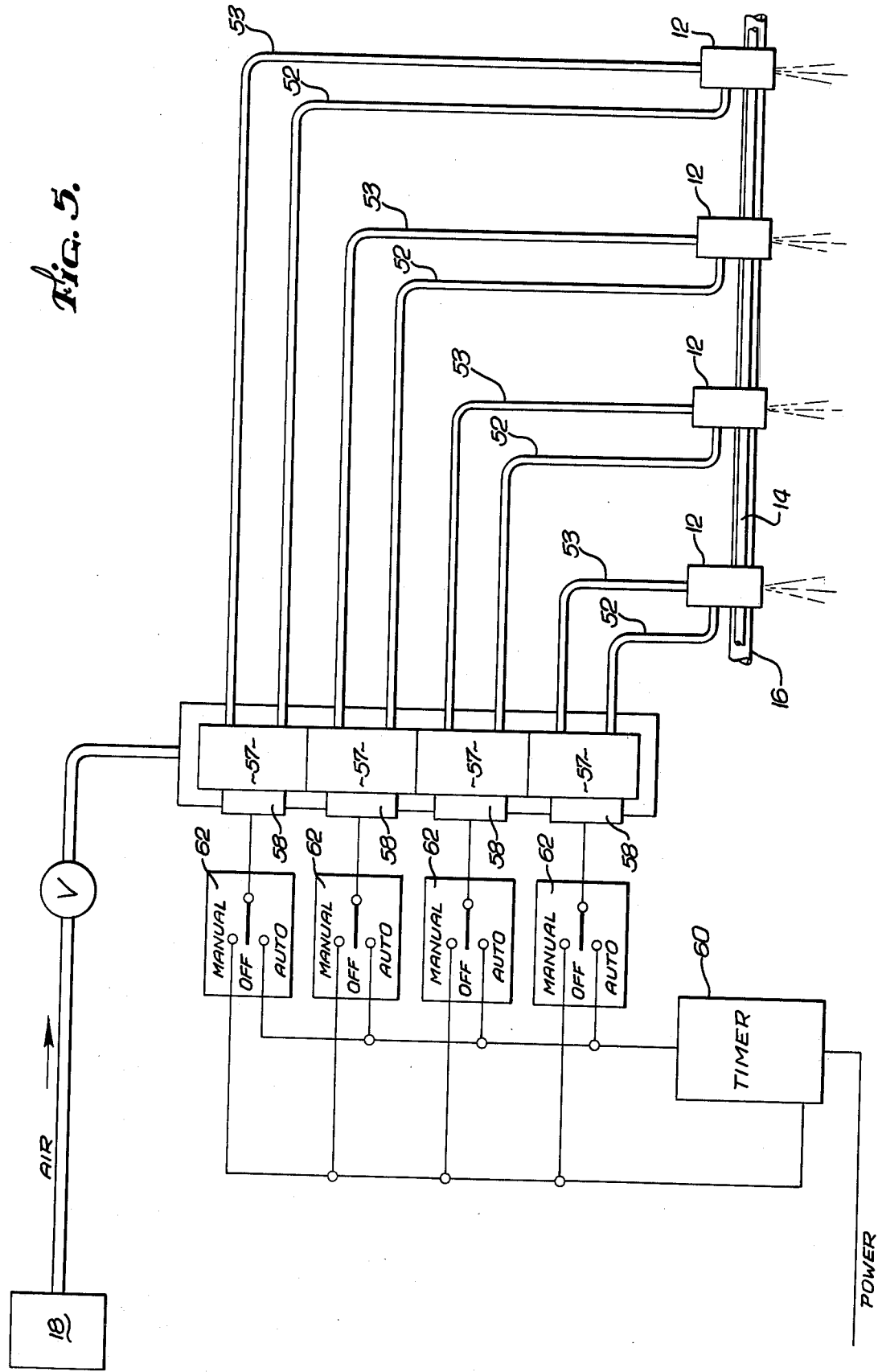
FIG. 5 is a diagramatic illustration showing the control air system of the apparatus of FIG. 1.

The nozzles 63 may be used with a timer 60, such as that shown in FIG. 5, and a manual override switch 62 can be provided in a similar manner. However, a bank of all the valves 63 included within a single housing 64 must be operated simultaneously since the valves are connected in series by the common control air passages 68 and 70.

One advantage of the embodiment of FIGS. 6 and 7 is that the number of components is reduced, thereby decreasing the cost of manufacture and assembly. It is also easier to clean the device manually since removal of the upper and lower housing sections 64A and 64B exposes all the nozzles 63.

It will be appreciated from the foregoing that the present invention provides a simple and reliable spray apparatus that is self-cleaning. It is particularly suitable for use with food ingredients that tend to clog nozzles and permits a considerable decrease in down time.

While a particular form of the invention has been illustrated and described, it will be apparent that various modifications can be made without departing from the spirit and scope of the invention.

I claim:

1. An enrobing apparatus for applying an ingredient spray to food products comprising:
   an ingredient tube for carrying a food ingredient to be sprayed;
   a spray air tube for carrying spray air to assist in the spraying of said ingredient;
   a housing;
   a nozzle opening within said housing, said nozzle opening including an inner orifice for said ingredient and an annular outer orifice surrounding said inner orifice for said spray air;
   a spray air passage connecting said spray air tube to said outer orifice;
   an ingredient passage connecting said ingredient tube to said inner orifice;
   a cylinder defined by said housing on the opposite side of said ingredient tube from said nozzle opening;
   a piston reciprocable within said cylinder;
   first and second air ports entering said cylinder on opposite sides of said piston;
   first and second control air passages connected to said first and second air ports, respectively, for supplying compressed control air to said cylinder to cause reciprocation of said piston; and
   a clean-out plunger connected to said piston and aligned with said inner orifice to enter and clean said inner orifice upon reciprocation of said piston.

2. The apparatus of claim 1 wherein said ingredient tube passes through said housing and said housing is thereby supported by said ingredient tube.

3. The apparatus of claim 1 wherein said housing includes separate upper and lower sections, said ingredient tube being clamped between said upper and lower sections, whereby said housing is supported.

4. The apparatus of claim 1 further comprising:
   control air supply means for supplying compressed air to said control air passages;
   air valve means for selectively directing said control air to said first or said second control air passage; and
   timer means for periodically actuating said valve means to cause reciprocation of said piston.

5. The apparatus of claim 4 further comprising manual override means for selectively actuating said valve means independently of said timer means.

6. The apparatus of claim 1 further comprising a wall that is at least partially conical separating said inner and outer orifices, said plunger having a conical portion adapted to engage said conical portion of said wall and an end portion of reduced diameter.

7. An enrobing apparatus for applying an ingredient spray to food products comprising:
   an ingredient tube for carrying a food ingredient to be sprayed;
   a spray air tube for carrying spray air;
   a housing mounted on said ingredient tube;
   a nozzle opening within said housing, said nozzle opening including an inner orifice for said ingredient and a concentric annular outer orifice surrounding said inner orifice for said spray air;
   a spray air passage connecting said spray air tube to said outer orifice;
   a cylinder defined by said housing on the opposite side of said ingredient tube from said nozzle opening;
   a piston reciprocable within said cylinder toward and away from said ingredient tube;
   an air port entering said cylinder;
   a control air passage connected to said air port for supplying compressed air to said cylinder to cause displacement of said piston;
   an aperture in said ingredient tube opposite said inner orifice; and
   a clean-out plunger secured to said piston and aligned with said aperture in said ingredient tube and said inner orifice to enter and clean said inner orifice upon displacement of said piston.

8. The apparatus of claim 7 wherein said housing has separable upper and lower sections, said ingredient tube being clamped between said upper and lower sections.

9. The apparatus of claim 7 further comprising:
   control air supply means for supplying compressed air to said control air passage;
   air valve means for selectively admitting compressed air to said control air passage; and
   timer means for periodically actuating said valve means to cause displacement of said piston.

10. An enrobing apparatus for applying an ingredient spray to food products comprising:

an ingredient tube for carrying a food ingredient to be sprayed;

a spray air tube for carrying spray air;

a housing mounted on said ingredient tube;

a nozzle opening within said housing, said nozzle opening including an inner orifice for said ingredient and an annular outer orifice surrounding said inner orifice for said spray air;

a spray air passage connecting said spray air tube to said outer orifice;

an ingredient passage connecting said ingredient tube to said inner orifice;

a cylinder defined by said housing on the opposite side of said ingredient tube from said nozzle;

a piston reciprocable within said cylinder toward and away from said ingredient tube;

first and second air ports entering said cylinder on opposite sides of said piston;

first and second control air passages connected to said first and second air ports, respectively, for supplying compressed air to said cylinder to cause reciprocation of said piston;

an aperture in said ingredient tube opposite said ingredient passage; and a clean-out plunger secured to said piston and aligned with said aperture, said ingredient tube, and said inner orifice to enter and clean said inner orifice upon reciprocation of said piston.

11. The apparatus of claim 10 wherein said housing has separable upper and lower sections, said ingredient tube being clamped between said upper and lower sections.

12. The apparatus of claim 10 further comprising:

control air supply means for supplying compressed air to said control air passages;

air valve means for selectively directing said control air to said first or said second control air passage; and timer means for periodically actuating said valve means to cause reciprocation of said piston.

13. The apparatus of claim 12 further comprising manual override means for selectively actuating said valve means independently of said timer means.

14. The apparatus of claim 10 further comprising a wall that is at least partially conical separating said inner and outer orifices, said plunger having a conical portion adapted to engage said conical portion of said wall and an end portion of reduced diameter.

15. An enrobing apparatus for applying an ingredient spray to food products comprising:

an elongated housing divided longitudinally into upper and lower sections;

an ingredient passage extending longitudinally through said lower section for carrying a food ingredient to be sprayed;

a spray air passage for carrying spray air;

a row of nozzle openings in said lower housing, each of said nozzle openings including an inner orifice for communicating with said ingredient passage and an annular outer orifice surrounding said inner orifice and communicating with said spray air passage;

a plurality of cylinders defined by said upper housing, each of said cylinders being axially aligned with one of said inner orifices and disposed on the opposite side of said ingredient passage from one of said nozzle openings;

a plurality of pistons each reciprocable within one of said cylinders toward and away from said ingredient passage;

first and second control air passages extending longitudinally through said housing and communicating with said cylinders on opposite sides of said pistons;

a plurality of clean-out plungers each secured to one of said pistons in alignment with a corresponding one of said inner orifices, whereby said plungers extend through said ingredient passage into said inner orifices upon reciprocation of said pistons;

control air supply means for supplying compressed air to said control air passages; and valve means for selectively directing said control air to said first or said second control air passage.

16. The apparatus of claim 15 further comprising timer means for periodically actuating said valve means to cause reciprocation of said piston.

17. The apparatus of claim 16 further comprising manual override means for selectively actuating said valve means independently of said timer means.

18. The apparatus of claim 15 further comprising a wall that is at least partially conical separating said inner and outer orifices, said plunger having a conical portion adapted to engage said conical portion of said wall and an end portion of reduced diameter.

* * * * *